United States Patent [19]

Tingley

[11] Patent Number: 5,547,729

[45] Date of Patent: Aug. 20, 1996

[54] GLUE-LAMINATED WOOD STRUCTURAL MEMBER WITH SYNTHETIC FIBER REINFORCEMENT

[76] Inventor: Daniel A. Tingley, 3310 SW. Willamette Ave., Corvallis, Oreg. 97333

[21] Appl. No.: 279,177

[22] Filed: Jul. 22, 1994

Related U.S. Application Data

[63] Continuation-in-part of Ser. No. 37,580, Mar. 24, 1993, Pat. No. 5,362,545.

[51] Int. Cl.$^6$ .............................. B32B 5/08; B32B 21/08; E04C 3/12; E04C 3/29

[52] U.S. Cl. ...................... 428/74; 52/223.8; 52/309.16; 52/730.1; 52/730.7; 52/DIG. 7; 156/178; 156/306.9; 156/307.7; 428/77; 428/114; 428/213; 428/294; 428/902

[58] Field of Search ............................ 52/223.8, 309.16, 52/730.1, 730.7, DIG. 7; 156/178, 306.9, 307.7; 428/77, 114, 213, 294, 902, 74

[56] References Cited

U.S. PATENT DOCUMENTS

| | | | |
|---|---|---|---|
| 2,536,183 | 1/1951 | Jamieson | 428/525 |
| 3,413,188 | 11/1968 | Allen . | |
| 3,890,077 | 6/1975 | Holman | 425/111 |
| 4,108,351 | 8/1978 | Hough | 229/62 |
| 4,242,406 | 12/1980 | El Bouhnini et al. | 428/236 |
| 4,312,162 | 1/1982 | Medney | 52/309.16 |
| 4,615,163 | 10/1986 | Curtis et al. | 52/730 |
| 4,965,973 | 10/1990 | Engebretsen | 52/223 R |
| 5,000,808 | 3/1991 | Deviney | 156/178 |
| 5,006,390 | 4/1991 | Kavesh et al. | 428/105 |
| 5,026,593 | 6/1991 | O'Brien | 428/215 |
| 5,135,793 | 8/1992 | Socha | 428/74 |

FOREIGN PATENT DOCUMENTS

4-149346  5/1992  Japan .

OTHER PUBLICATIONS

Rowlands et al., "Fiber–Reinforced Wood," *Wood and Fiber Science*, Jan. 1986, V. 18(1), pp. 39–57.

Wood Design Focus, A Newsletter of Contemporary Wood Engineering, vol. 4, No. 2, Summer 1993, R. J. Leichti, Editor.

Von de Kuilen, Proceedings of the 1991 International Timber Engineering Conference, vol. 3, Sep. 2–5, 1991, pp. 226–233.

Tingley, Proceedings of the 1988 International Conference on Timber Engineering, vol. I, Sep. 19–22, 1988, pp. 422–427.

Tingley, Reinforced Glued–Laminated Wood Beams, 96 page Thesis accepted Nov., 1987 by the University of New Brunswick (Canada) as partial fulfillment for M.S. Eng., Dept. of Civil Engineering.

Tingley, "Predicting Strength Criteria for Kevlar and Fiberglass Reinforced Plastic (KRP & FRP) Glued Laminated Beams," pp. 301–304 from vol. 2 of the Proceedings of the Second *Pacific Engineering Conference*, 1989.

*Primary Examiner*—James C. Cannon
*Attorney, Agent, or Firm*—Stoel Rives LLP

[57] ABSTRACT

A glue laminated structural wood member for bearing a structural loads transverse includes multiple laminae bonded together and arranged according to their moduli of elasticity. In an alternative embodiment, the structural wood member includes a synthetic compression reinforcement positioned in a portion of the member subjective to compressive stresses.

24 Claims, 2 Drawing Sheets

GLUE-LAMINATED WOOD STRUCTURAL MEMBER WITH SYNTHETIC FIBER REINFORCEMENT

RELATED APPLICATION

This application is a continuation-in-part of U.S. patent application No. 08/037,580, filed Mar. 24, 1993 for "Aligned Fiber Reinforcement Panel for Structural Wood Members", now U.S. Pat. No. 5,362,545.

TECHNICAL FIELD

The present invention relates to wood structural members and, in particular, to improved glue laminated wood structural members.

BACKGROUND OF THE INVENTION

Beams, trusses, joists, and columns are the typical structural members that support the weight or loads of structures, including buildings and bridges. Structural members may be manufactured from a variety of materials, including steel, concrete, and wood, according to the structure design, environment, and cost.

Wood structural members are now typically manufactured from multiple wood segments that are bonded together, such as in glue-laminated members, laminated veneer lumber, parallel strand lumber and I-beams. These manufactured wood structural members have replaced sawn lumber or timbers because the former have higher design limits resulting from better inspection and manufacturing controls. Wood is a desirable material for use in many structural members because of its various characteristics, including strength for a given weight, appearance, cyclic load response, and fire resistance.

In any application, a load subjects a structural member to both compressive and tensile stresses, which correspond to the respective compacting and elongating forces induced by the load on opposite sides of the member. By convention, a neutral plane or axis extends between the portions of the member under compression and tension. The structural member must be capable of bearing the compressive and tensile stresses without excessive strain and particularly without ultimately failing.

Reinforcement of wood structural members in regions subjected to tensile stresses are known. For example, U.S. Pat. No. 5,026,593 of O'Brien describes the use of a thin flat aluminum strip to reinforce a laminated beam. The use of a synthetic tension reinforcement having multiple aramid fiber strands held within a resin matrix adhered to at least one of the wood segments in the tension portion of the structural member is described by the inventor of the present application in "Reinforced Glued-Laminated Wood Beams" presented at the 1988 International Conference on Timber Engineering. However, wood structural members also include regions subjected to compressive stresses, and the reinforcements suitable for tensile reinforcement are typically not suitable for compressive reinforcement.

Many glue laminated structural wood members are manufactured according to manufacturing standards 117-93 of the American Institute of Timber Construction (AITC) of Englewood, Colo. These manufacturing standards specify, for example, a visual wood knot grade in which knots in the wood laminae in the tension zone, defined as the 10 percent of the depth a beam under greatest tension, have diameters of no more than 25 percent of the widths of the wood laminae. Aside from such visual grade specifications, however, the positions of wood laminae of varying stiffness and strength are allowed to be random in the conventional manufacture of glue laminated structural wood members.

The AITC manufacturing standards and the conventional manufacturing practices provide glue laminated wood members that are of generally high quality and have generally high design limits. However, limited availability of affordable higher quality wood can increase the cost or reduce the quality of glue laminated wood members. In addition, relatively inexpensive alternative structural materials such as steel and concrete require that the quality and design capabilities of glue laminated structural wood members be improved to maintain or improve competitiveness.

SUMMARY OF THE INVENTION

An object of the present invention is, therefore, to provide glue laminated wood structural members with synthetic fiber reinforcement.

Another object of this invention is to provide glue laminated wood structural members that include reinforcement of regions subjected to compressive stress.

A further object of this invention is to provide glue laminated wood structural members with a specified arrangement of wood laminations according to quality.

Still another object of this invention is to provide such wood structural members with a fixed wood knot size grade.

The present invention includes glue laminated wood structural members in which multiple elongate wood segments are bonded together with their lengths generally aligned with the length of the member. In a first preferred embodiment, a synthetic compression reinforcement is adhered to at least one of the wood segments in a region of the wood structural member subjected to compression stress. The synthetic compression reinforcement includes multiple synthetic fiber strands having a high modulus of elasticity in compression (e.g., carbon) held within a resin matrix. This synthetic compression reinforcement is preferably used in combination with a synthetic tension reinforcement in the portion of the wood member subjected to tensile stress.

In another preferred embodiment, the wood segments or laminae of the glue laminated wood structural member are arranged specifically according to the moduli of elasticity of the laminae. Wood laminae with relatively high moduli of elasticity (e.g., greater than $1.8 \times 10^6$ psi for Douglas fir) are placed in regions of high tensile stress, high compressive stress, or both. Relatively inexpensive low grade wood laminae, such as that having relatively low moduli of elasticity (e.g., less than $1.5 \times 10^6$ psi for Douglas fir), are placed in regions of lower tensile or compressive stress. Such arrangements of the wood laminae allow the strength and stiffness of glue laminated structural wood members to be controlled separately and can be manufactured at relatively low cost.

In still another preferred embodiment, the wood segments or laminae in high tensile stress regions of the glue laminated wood structural member are selected according to an enhanced wood knot grade. By using a wood knot grade in which the wood segments or laminae in a predetermined portion of the structural member conform to an absolute knot size standard, evaluation of the wood segments in such a fashion, with various grades of wood, may be used to improve the competitiveness of such glue laminated wood structural members by improving their strength.

DETAILED DESCRIPTION OF PREFERRED EMBODIMENTS

Figure 1:
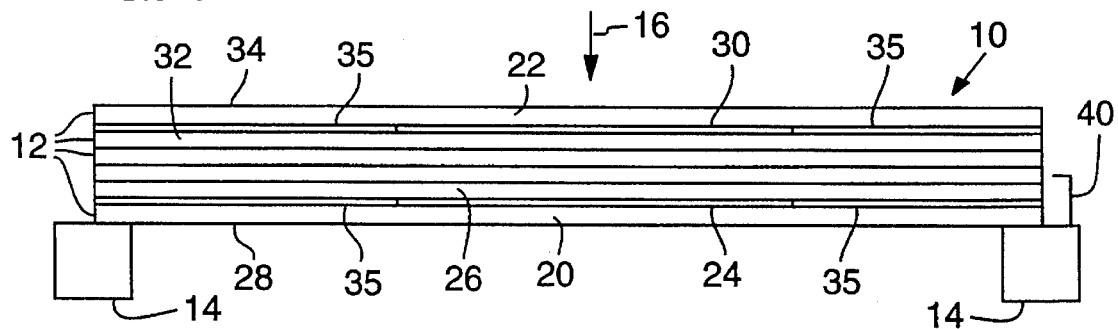
FIG. 1 is an elevation view of an exemplary glue laminated structural wood member having synthetic fiber reinforcement according to the present invention.

FIG. 1 shows a glue laminated wood structural member 10 having multiple wood laminae 12 that are bonded together and are preferably elongate boards. In this configuration, glue laminated wood member 10 is configured as a glue-laminated timber according to manufacturing standards 117-93 of the American Institute of Timber Construction (AITC) of Englewood, Colo.

A typical structural use of glue laminated wood member 10 is to extend as a beam over and bear a load along an otherwise open region. As a simplified, exemplary representation of such use, glue laminated wood member 10 is shown with its ends supported by a pair of blocks 14 and bearing a point load 16 midway between blocks 14. It will be appreciated, however, that glue laminated wood member 10 of the present invention could also bear loads distributed in other ways (e.g., cantilevered) or be used as a truss, joist, or column.

Under the conditions represented in FIG. 1, a lowermost lamina 20 is subjected to a substantially pure tensile stress, and an uppermost lamina 22 is subjected to a substantially pure compressive stress. To increase the tensile load-bearing capacity of glue laminated wood member 10, at least one layer of synthetic tension reinforcement 24 is adhered between lowermost lamina 20 and a next adjacent lamina 26 or, alternatively, to only an outer surface 28 of lowermost lamina 20. To increase the compressive load-bearing capacity of glue laminated wood member 10, at least one layer of synthetic compression reinforcement 30 is adhered between uppermost lamina 22 and a next adjacent lamina 32 or, alternatively, to only the outer surface 34 of uppermost lamina 22. Synthetic reinforcements 24 and 30 are described below in greater detail.

Glue laminated structural wood member 10 in FIG. 1 includes a simplified, exemplary number of wood laminae 12 and shows reinforcements 24 and 30 in exemplary locations. It will be appreciated that glue laminated structural wood members of the present invention could include a wide range of numbers of wood laminae 12 and that the locations of reinforcements 24 and 30 within such members could vary widely.

Synthetic tension reinforcement 24 and synthetic compression reinforcement 30 are generally centered about load 16 and preferably extend along about two-fifths to three-fifths the length of wood structural member 10, depending on load 16. Such partial length reinforcements 24 and 30 substantially provide the strength and stiffness enhancements of full-length reinforcements but at reduced cost. A pair of wood spacers 35 are positioned at opposite ends of synthetic tension reinforcement 24 between laminae 20 and 26 to maintain a uniform separation therebetween. Similarly, a pair of wood spacers 35 are positioned at opposite ends of synthetic compression reinforcement 30 between laminae 22 and 32 to maintain a uniform separation therebetween.

Wood spacers 35 are preferably of solid wood and have a thickness that is greater than the thicknesses of synthetic reinforcements 24 and 30. Wood spacers 35 are more compressible than synthetic reinforcements 24 and 30 and the greater thickness of wood spacers 35 substantially offsets the greater compressibility. As a result, the adjacent layers of synthetic reinforcements 24 and 30 and wood spacers 35 have improved uniformity of thickness when bonded together in member 10. Wood spacers 35 of Douglas fir, for example, would preferably have a thickness that is 2–4 percent greater than that of synthetic reinforcements 24 and 30. Wood spacers 35 of other species could have different thicknesses according to differing compressibility.

Wood spacers 35 of solid wood are superior to ones of plywood because the latter are highly susceptible to rolling shear, which can cause premature failure in wood member 10. This rolling shear in wood spacers of plywood occurs because the orientations of wood grain in successive plys are transverse to each other. As a consequence, some plys have wood grain that is transverse to and unable to bear shearing stress.

A consequence of partial length reinforcements 24 and 30 is that load 16 induces relatively high stress at their ends. Wood laminae 12 are frequently manufactured from smaller elongate wood segments (not shown) that are fitted and bonded together at their ends. Typically the ends of the wood segments are fitted as finger joints. Although the bonds of such finger joints are typically relatively strong, most wood laminae 12 are relatively weakest in the vicinity of such joints due to the relative discontinuities in wood fiber.

In accordance with the present invention, wood laminae 12 immediately adjacent reinforcements 24 and 30, such as wood laminae 20 and 26 and 22 and 32, are positioned so that any joints in laminae 12 are at least a predetermined minimum distance from the ends of reinforcements 24 and 30. As a result, the stresses localized about the ends of partial length reinforcements 24 and 30 are not applied to adjacent laminae 12 at relatively weak joints. Preferred minimum distances between the ends of partial length reinforcements 24 and 30 and joints in adjacent laminae 12 range between 12 and 24 inches (30.5–61 cm.).

Joints (e.g., finger joints) in wood laminae 20 positioned immediately below synthetic tension reinforcement 24, sometimes called a bumper layer, preferably are bonded less thoroughly than conventional joints in wood laminae 12. Wood laminae 20 can sometimes fail, resulting in cracks, under the strain imparted by synthetic tension reinforcement 24. While they would have very little effect on the overall strength of wood member 10, such cracks could be aesthetically unpleasing and disconcerting for persons observing them.

In a preferred embodiment, joints in lamina 20 could be bonded with "dry gluing" procedures in which glue application timing is less than optimal, as is known in the art. Joints bonded in this manner can have as little as 25 percent of the strength of joints bonded in conventional manners. The weaker bonds allow failure in wood laminae 20 to occur at the (finger) joints, rather than at other locations in laminae 20. This allows the failure to proceed more smoothly and less abruptly, thereby being less noticeable and aesthetically unpleasing.

Glue laminated structural wood member 10 preferably includes no wood laminae 12 immediately adjacent reinforcements 24 and 30, such as wood laminae 20 and 26 and 22 and 32, formed from "juvenile wood," which is generally recognized in the art. Juvenile wood is undesirable in wood laminae 12 immediately adjacent reinforcements 24 and 30 because juvenile wood has a modulus of rupture that is as much as 50 percent lower than that of mature wood. Juvenile wood used as wood laminae 12 immediately adjacent reinforcements 24 and 30 can initiate failures in structural wood member 10 due to the relatively high stresses adjacent reinforcements 24 and 30 and the low modulus of rupture of such wood laminae 12. Such localized failures can lead to ultimate failure of a wood member.

With regard to Douglas fir, for example, juvenile wood is generally considered to be that formed during the first 15–20 years of growth. As known in the art, however, different wood species have different ages that are characteristic of juvenile wood.

Figure 2:
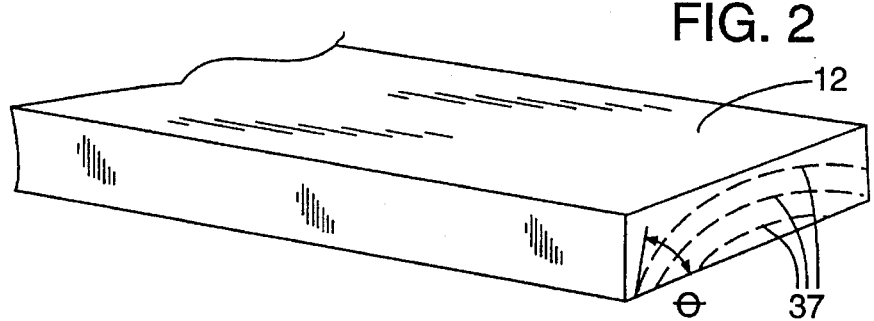
FIG. 2 is a perspective end view of a portion of an exemplary wood lamina used in the glue laminated structural wood member of FIG. 1.

Referring to FIG. 2, a novel method of identifying juvenile wood formed near the pith or central growth ring of a tree is described. Each wood lamina 12 has growth rings 37 that are exposed at its end and extend through the length of lamina 12. Juvenile wood may be characterized as having growth rings 37 that form an angle $\theta$ of more than a predetermined value, such as 30°, with a major surface of wood lamina 12. This simple method of identifying juvenile wood can simplify the manufacture of glue laminated structural wood member 10 with high strength.

Synthetic compression reinforcement 30 provides enhancement of the compressive stress bearing capability of glue laminated wood member 10. As a substitute for a portion of wood laminae 12, synthetic compression reinforcement 30 allows efficient selection of materials to optimize the cost and strength of glue laminated wood member 10. Previously, only tension reinforcements were used for structural wood members due to their tendency to fail in tensile stress regions.

Figure 3A:
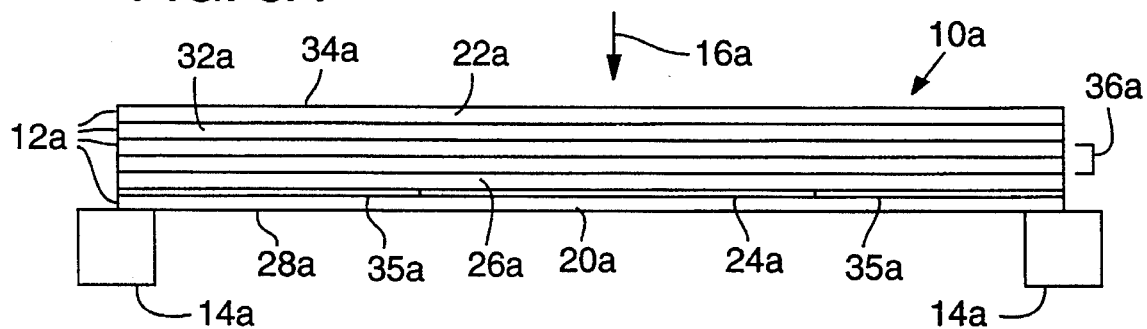
FIGS. 3A and 3B are elevation views of alternative glue laminated structural wood members in which laminae are arranged according to their moduli of elasticity.
Figure 3B:
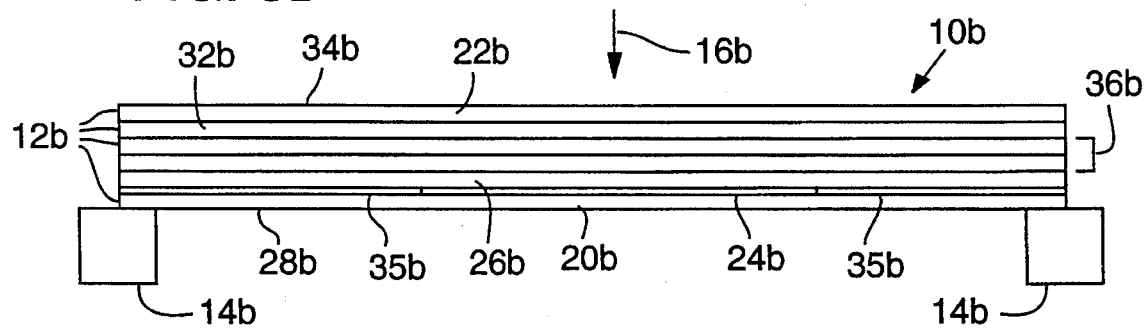

FIGS. 3A and 3B show alternative glue laminated structural wood members 10a and 10b in which wood laminae 12a and 12b are arranged according to their moduli of elasticity. Such arrangements of wood laminae 12, together with synthetic reinforcements 24a, 24b, and optionally 30, allow the strength and other characteristics, such as stiffness, of glue laminated structural wood members 10 to be separately controlled. Synthetic reinforcements 24a, 24b, and optionally 30, also allow wood of lower grades and lower cost to be used in virtually all regions of glue laminated structural wood members 10a and 10b, thereby further reducing material costs.

Synthetic tension reinforcements 24a and 24b provide wood members 10a and 10b with enhanced tensile strength. Similarly, optional synthetic compression reinforcements 30 (not shown in FIGS. 3A and 3B) would provide wood members 10a and 10b with enhanced compressive strength. Wood laminae 12a and 12b having relative high moduli of elasticity (e.g., greater than $1.8 \times 10^6$ psi for Douglas fir) are relatively stiff and may be used to enhance separately the stiffness of wood members 10a and 10b.

The strength enhancement of wood members 10a and 10b provided by synthetic tension reinforcements 24a and 24b, and optionally synthetic compression reinforcements 30 (not shown), allows wood laminae 12a and 12b that have relative high moduli of elasticity to enhance the stiffness of wood members 10a and 10b without requiring that the same wood laminae 12a and 12b also meet conventional visual wood grade requirements for strength, as typically required in conventional unreinforced glue laminated structural wood members. The strength enhancement also allows wood laminae 12a and 12b of lower grades or having intermediate or low moduli of elasticity (e.g., between $1.5 \times 10^6$ psi and $1.8 \times 10^6$ psi or less than $1.5 \times 10^6$ psi, respectively, for Douglas fir), which are typically relatively inexpensive, to be used in regions of relatively low stress, thereby decreasing the cost of glue laminated wood member 10 without adversely affecting its strength. In addition, certain wood laminae 12b having low moduli of elasticity can undergo correspondingly high strain before failure to enhance the load bearing capability of wood member 10b.

FIG. 3A shows glue laminated structural wood member 10a with a configuration having enhanced stiffness, as is required in some structural applications. Selection of and variation in the relative strength and stiffness of structural wood members in described in copending U.S. patent application Ser. No. 08/269,004, filed Jun. 30, 1994 by the inventor of the present application for Method of Manufacturing Wood Structural Member With Synthetic Fiber Reinforcement, which application is hereby incorporated by reference.

Referring to FIG. 3A, at least lowermost laminae 20a and 26a and uppermost laminae 22a and 32a of glue laminated wood member 10a have relatively high moduli of elasticity (e.g., greater than $1.8 \times 10^6$ psi for Douglas fir). Wood laminae 12a in a central region 36a may be of low grades or undetermined moduli of elasticity (e.g., between $1.5 \times 10^6$ psi and $1.8 \times 10^6$ psi for Douglas fir). Synthetic tension reinforcement 24a is adhered between lowermost lamina 20a and next adjacent lamina 26a. As an alternative embodiment, wood member 10a could include synthetic compression reinforcement 30a adhered between uppermost lamina 22a and a next adjacent lamina 32a. (It will be appreciated that FIG. 3A is a simplified representation of wood member 10a and that central region 36a would typically have many more than two wood laminae 12a as shown.)

FIG. 3B shows glue laminated structural wood member 10b in a configuration with relaxed stiffness characteristics, thereby allowing wood member 10b to deflect under load as is acceptable in some applications. At least uppermost laminae 22b and 32b of glue laminated wood member 10b have relatively high moduli of elasticity (e.g., greater than $1.8 \times 10^6$ psi for Douglas fir) to provide wood member 10b with at least a minimum required stiffness. Wood laminae 12b in a central region 36b may be of low grades or undetermined moduli of elasticity (e.g., between $1.5 \times 10^6$ psi and $1.8 \times 10^6$ psi for Douglas fir). Lowermost laminae 20b and 26b have relatively low moduli of elasticity (e.g., less than $1.5 \times 10^6$ psi for Douglas fir) and additional characteristics that allow laminae 20b and 26b to undergo substantial strain before failure.

In this embodiment, glue laminated wood member 10b necessarily includes synthetic tension reinforcement 24b, which is shown adhered between lowermost lamina 20b and next adjacent lamina 26b and may alternatively be adhered to outer surface 28b of lowermost lamina 20b to provide wood member 10b with adequate tensile strength. The relatively low moduli of elasticity of lowermost laminae 20b and 26b, together with certain characteristics that can prevent initiation of failure, allow them to bear relatively high strain before failure, thereby allowing wood member 10b to bear correspondingly large loads. Preferred characteristics of lowermost laminae 20b and 26b to allow them to undergo "superstrain" are the absence of knots of a diameter greater than 0.875 inch (2.22 cm), straight grain without slope (i.e., more than 1:16 variation in orientation from the wood longitudinal axis), and low density.

For example, wood laminae 12a with high moduli of elasticity positioned adjacent synthetic tension reinforcement 24a may be capable of bearing a strain of about 1% before failing. Wood laminae 12b with low moduli of elasticity and sufficient superstrain characteristics positioned adjacent synthetic tension reinforcement 24b may be capable of bearing a strain of about 1.5% before failing, thereby providing a 50% increase in the load bearing capability wood member 10b over that of wood member 10a. Such enhanced load bearing capability is possible because synthetic tension reinforcement 24b substantially bears the tensile stress in glue laminated wood member 10b. The relatively high moduli of elasticity of at least uppermost laminae 22b and 32b provides wood member 10b with at least the minimal stiffness required to avoid failure.

The moduli of elasticity values designated as relatively high, relatively low, and intermediary are specific to Douglas fir. It will be appreciated that other wood species will have moduli of elasticity of different values. Each wood species will have a characteristic range of moduli of elasticity, and the applicability of the present invention to such ranges will be apparent to persons skilled in the art. Moduli of elasticity are generally measurable by, for example, machine stress raters that flex a sample and compare it to known flexure resistances.

The standard visual grades for each wood species will also typically differ. Standard visual grades promulgated by the AITC for Douglas fir, for example, are designated L-1, L-2, and L-3 and refer to successively lower grades of wood. It will be appreciated that the above description of the present invention with reference to Douglas fir is similarly applicable to other wood species despite any differences in the designations and standards for their visual grades.

In contrast to such specific arrangements of wood laminae 12 in glue laminated wood structural member 10, the wood laminae in conventional glue laminated wood structural members merely have an average modulus of elasticity and are arranged randomly with regard to their moduli of elasticity. The wood laminae in most conventional glue laminated wood structural members are arranged according to visual grade, which is generally directed to defects and only incidentally relates to modulus of elasticity. Some conventional glue laminated wood structural members generally use visually graded wood laminae, but also use in high stress regions wood laminae having high moduli of elasticity.

However, such conventional glue laminated wood structural members, which do not include synthetic reinforcements, are not capable of the selective balance between strength and stiffness provided by the combination of the present invention. Reliance on individual wood laminae to provide combined strength and high moduli of elasticity can be very expensive, or even impossible, due to the relative unavailability of high strength, low defect wood.

Referring to FIG. 1, wood laminae 12 of glue laminated structural wood member 10 in a predetermined tension region 40 preferably satisfy a fixed knot grade standard regardless of the size of wood member 10. Such an enhanced knot grade standard, together with synthetic tension reinforcement 24, increases the strength of wood member 10 by up to 20 percent over reinforced glue laminated structural wood members with conventional knot grade standards.

The conventional AITC 117-93 visual knot grade standard for glue laminated wood structural members is that knots in the wood laminae in the tension zone, defined as the 10 percent of the depth a beam under greatest tension, have diameters no more than 25 percent of laminae width. In accordance with the present invention, a fixed, enhanced knot grade standard is applied to wood laminae 12 in tension region 40 in the vicinity of synthetic tension reinforcement 24. The enhanced knot grade standard specifies that each wood lamina 12 within tension region 40 include no knots with a diameter greater than 7/8 inch (2.25 cm) over 2/3 the length of lamina 12. Tension region 40 includes the greater of four wood laminae 12 or 15 percent the depth of wood member 10.

This knot grade standard is designated by AITC as being applicable only to glue laminated structural wood members with widths of 3⅛ inches (8 cm). Applying this standard to glue laminated structural wood members 10 of greater widths (e.g., at least up to 12.75) functions to enhance the knot grade standard, which decreases the likelihood of knots initiating failure in wood member 10. Knotted wood can fail under a strain that is as low as one-tenth the strain at which comparable clear wood would fail. As a result, knots in wood laminae 12 in the vicinity of synthetic tension reinforcement 24 can initiate failures in structural wood member 10 due to the relatively high strains adjacent reinforcement 24. Such localized failures can lead to ultimate failure of a wood member.

Figure 4A:
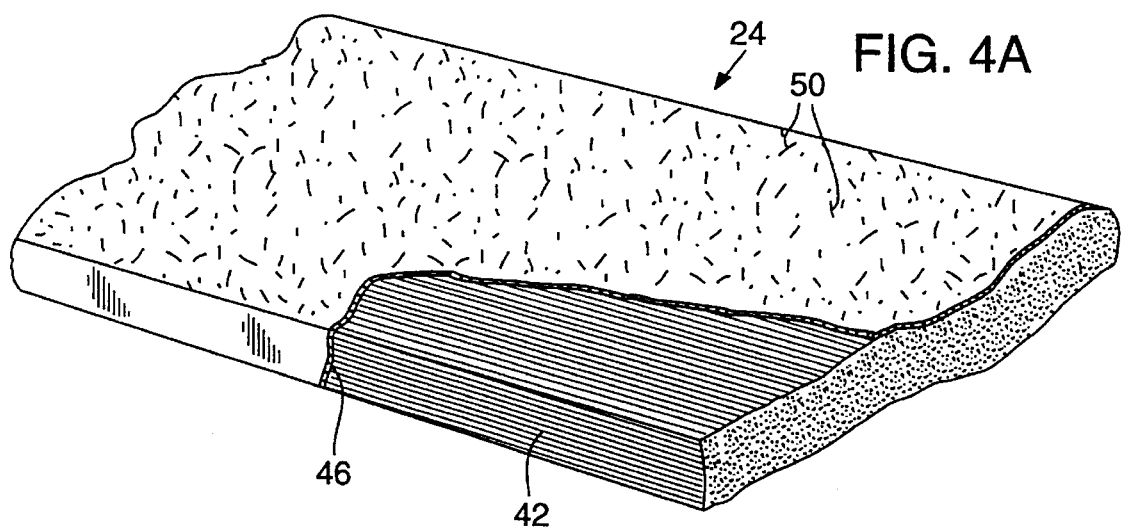
FIGS. 4A and 4B are perspective views of portions of respective synthetic tension and compression reinforcements with portions cut-away to show the alignments and orientations of fibers in the reinforcements.
Figure 4B:
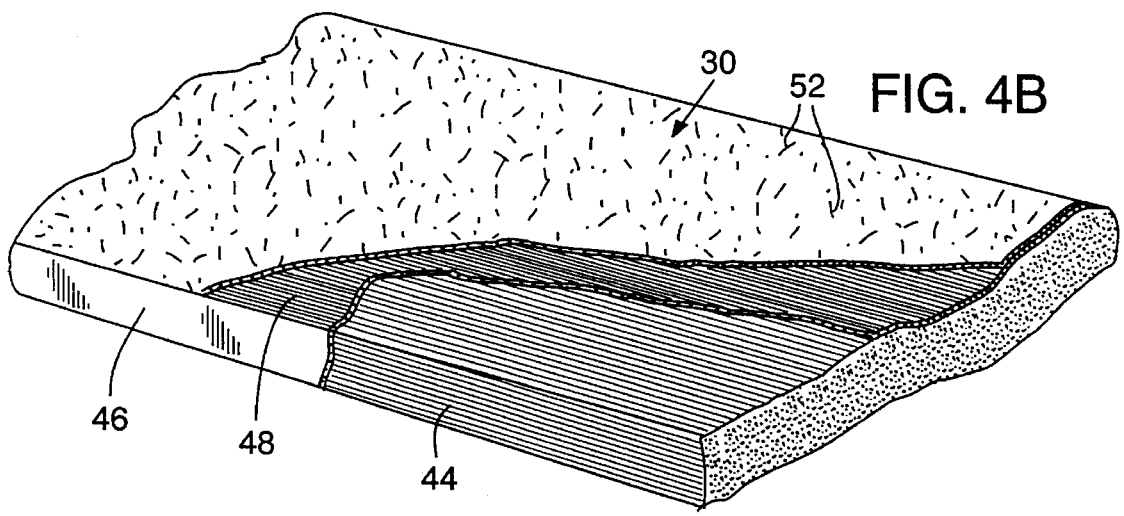

FIGS. 4A and 4B are enlarged perspective views of one layer each of preferred synthetic tension reinforcement 24 and preferred synthetic compression reinforcement 30, respectively. Tension reinforcement 24 and compression reinforcement 30 have large numbers of synthetic fibers 42 and 44 that are arranged parallel to one another, aligned with the length of reinforcements 24 and 30, and have relatively high moduli of elasticity in tension and compression, respectively.

A resin material 46 surrounds and extends into the interstices between synthetic fibers 42 and 44 to maintain them in their arrangement and alignment. To facilitate their adhesion to wood laminae 12, reinforcements 24 and 30 are preferably manufactured and treated as described in copending U.S. patent application Ser. No. 08/037,580, filed Mar. 24, 1993, which is hereby incorporated by reference.

Accordingly, compression reinforcement 44 includes a synthetic fiber layer 48 that further enhances the adhesion of compression reinforcement 30. Also, the major surfaces of reinforcements 24 and 30 are abraded or "haired up" so that adjacent fibers 42 and 48 are broken and their ends 50 and 52 protrude from resin material 46, respectively.

The parallel arrangement and longitudinal alignment of the fibers 42 and 44 provide synthetic tension reinforcement 24 and synthetic compression reinforcement 30 with maximal strength. Suitable for use as synthetic tension fibers 42 and synthetic fiber layer 48 are aramid fibers, which are commercially available from E. I. DuPont de Nemours & Co. of Delaware under the trademark "KEVLAR," and high modulus polyethylene which is available under the trademark "SPECTRA" from Allied Fibers of Allied Signal, Petersberg, Va. A preferred grade of synthetic fibers 42 and layer 48 is an aramid fiber available as "KEVLAR 49."

Synthetic fibers 42 preferably have a modulus of elasticity in tension that is relatively high. For example, synthetic fibers 42 of Kevlar™ have a modulus of elasticity in tension of about 18×10⁶ psi (124,000 MPa). Synthetic tension reinforcement 24 comprising about 60 percent synthetic fibers 42 to 40 percent resin material 46 (by volume) has a modulus of elasticity in tension of about 11×10⁶ psi (75,900 MPa).

Suitable for use as synthetic compression fibers 44 are commercially available carbon fibers, which have a modulus of elasticity in compression of about 30×10⁶ psi (206,900 MPa). Synthetic compression reinforcement 30 comprising about 60 percent synthetic fibers 44 to 40 percent resin material 46 (by volume) has a modulus of elasticity in compression of about 18×10⁶ psi (124,000 MPa). Resin material 46 used in fabrication of both reinforcement 24 and reinforcement 30 is preferably an epoxy resin, but could alternatively be other resins such as polyester, vinyl ester, phenolic resins, polyimides, or polystyrylpyridine (PSP) or thermoplastic resins such as polyethylene terephthalate (PET) and nylon-66.

In some structural applications, the loads applied to glue laminated wood member 10 are reversible so that in one instance laminae 20 and 22 are subjected to respectively tensile and compressive stresses but at another instance the stresses are reversed. Under these conditions, wood member 10 typically must be balanced with regard to its ability to bear tensile and compressive loads. Synthetic tension reinforcement 24 with synthetic fibers 42 of an aramid would typically be unable to meet this requirement and would be substituted for with synthetic reinforcement 30.

Synthetic reinforcement 24 with synthetic fibers 42 of an aramid has substantially less strength and a much lower modulus of elasticity in compression than in tension. This wide disparity in the compressive and tensile characteristics of aramids makes them unsuitable for use in balanced load situations. In contrast, synthetic reinforcement 30 predominantly with carbon fibers 44 has substantially similar strength and modulus of elasticity characteristics in compression and in tension. As a result, synthetic reinforcement 30 predominantly with carbon fibers 44 could be positioned as shown in FIG. 1 and substituted for synthetic reinforcement 24 in a balanced load application. Synthetic reinforcement predominantly with fiberglass fibers also has substantially similar strength and modulus of elasticity characteristics in compression and in tension and could be substituted for synthetic reinforcements 24 and 30 in a balanced load application. These reinforcement arrangements for balanced loading of wood member 10 may be used with any compatible arrangements of wood laminae 12 including, for example, arrangements with or without enhanced stiffness characteristics.

It will be obvious to those having skill in the art that many changes may be made to the details of the above-described embodiment of this invention without departing from the underlying principles thereof. The scope of the present invention should be determined, therefore, only by the following claims.

I claim:

1. A laminated wood structural member for bearing a structural load that creates compressive and tensile stresses in the structural member in respective compression and tension portions on opposite sides of a neutral axis, the structural member having a longitudinal axis and comprising:

plural elongate wood laminae having lengths and bonded together with their lengths generally aligned with the longitudinal axis;

a synthetic tension reinforcement having plural tension fiber strands held within a resin casing, the synthetic tension reinforcement being bonded to at least one of the wood laminae in the tension portion of the structural member; and a synthetic compression reinforcement having plural compression fiber strands held within a resin casing, the fiber strands including strands of carbon and the synthetic compression reinforcement being bonded to at least one of the wood laminae in the compression portion of the structural member.

2. A bonded laminar wood structural member having a length and for bearing a structural load, the member comprising:

a plurality of wood laminae bonded together; and a synthetic reinforcement having a plurality of fiber strands encased within a resin casing, the reinforcement being shorter than the structural member and being bonded between two of the wood laminae.

3. The wood structural member of claim 2 in which the synthetic reinforcement includes a plurality of layers of resin-encased fibers bonded together.

4. The wood structural member of claim 2 in which the member has compression and tension portions and in which the synthetic reinforcement is placed within the tension portion of the member.

5. The wood structural member of claim 4 in which the fibers of the synthetic reinforcement placed within the tension portion of the member include aramid fibers.

6. The wood structural member of claim 5 in which the fibers of the synthetic reinforcement placed within the tension portion of the member are exclusively aramid fibers.

7. The wood structural member of claim 4 in which the wood laminae are arranged from lowermost to uppermost positions, the synthetic reinforcement is placed between the two lowermost wood laminae, and the lowermost wood lamina includes at least two segments of wood bonded together lengthwise by finger joints, the finger joints being intentionally formed so that the finger joint strength is significantly weaker than the strength of finger joints bonded in accordance with conventional manners.

8. The wood structural member of claim 4 in which the reinforcement has opposite ends and in which at least one of the laminae includes at least two segments of wood bonded together lengthwise by finger joints, any of the finger joints of the lamina bonded to the synthetic reinforcement being located a predetermined distance from each of the ends of the reinforcement.

9. The wood structural member of claim 4 in which a synthetic reinforcement is placed within the compression portion of the member.

10. The wood structural member of claim 9 in which the fibers of the synthetic reinforcement placed in the compression portion of the member include compression fibers.

11. The wood structural member of claim 10 in which the fibers of the synthetic reinforcement placed in the compression portion of the member include carbon fibers.

12. The wood structural member of claim 11 in which the fibers of the synthetic reinforcement placed in the compression portion of the member are exclusively carbon fibers.

13. The wood structural member of claim 2 further including spacers positioned on either side of the synthetic reinforcement.

14. The wood structural member of claim 13 in which the spacers are made of wood.

15. The wood structural member of claim 14 in which the wooden spacers are thicker and more compressible than the synthetic reinforcement.

16. The wood structural member claim 14 in which the wooden spacers made are of solid wood.

17. A bonded laminar wood structural member for bearing a structural load that creates tensile stress in a tension portion and creates compressive stress in a compression portion, the member comprising:

a plurality of wood laminae bonded together; and a synthetic reinforcement having a plurality of fiber strands encased within a resin casing, the reinforcement being shorter than the member and being bonded to at least one of the wood laminae in the compression portion of the structural member.

18. The wood structural member of claim 17 in which the fibers of the synthetic reinforcement placed in the compression portion of the member include compression fibers.

19. The wood structural member of claim 18 in which the fibers of the synthetic reinforcement placed in the compression portion of the member include carbon fibers.

20. The wood structural member of claim 19 in which the fibers of the synthetic reinforcement placed in the compression portion of the member are exclusively carbon fibers.

21. The wood structural member of claim 17 in which the synthetic reinforcement includes a plurality of layers of resin-encased fibers bonded together.

22. The member of claim 17 having a top lamina with a top surface and in which the synthetic reinforcement is bonded to the top surface of the top lamina.

23. A laminated wood structural member for bearing a structural load that creates compressive and tensile stresses in the structural member in respective compression and tension portions of the structural member, the member comprising:

a plurality of wood laminae bonded together, the wood laminae having moduli of elasticity with a range of values and being arranged within the member in a substantially hierarchical manner according to moduli of elasticity such that the laminae of greater moduli of elasticity are positioned in a zone of greatest compressive stress and the laminae of lower moduli of elasticity are positioned in a zone of greatest tensile stress; and a synthetic reinforcement bonded to one or more wood laminae in the tension portion of the member.

24. The member of claim 23 further comprising a synthetic reinforcement bonded to at least one of the wood laminae in the compression portion of the member.

* * * * *